(12) United States Patent
Choo et al.

(10) Patent No.: US 12,353,495 B2
(45) Date of Patent: Jul. 8, 2025

(54) METHOD AND APPARATUS FOR PROVING INFORMATION BASED ON IMAGE

(71) Applicant: Research & Business Foundation SUNGKYUNKWAN UNIVERSITY, Suwon-si (KR)

(72) Inventors: Hyunseung Choo, Gwacheon-si (KR); Ha Nl Choi, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 18/107,611

(22) Filed: Feb. 9, 2023

(65) Prior Publication Data

US 2023/0252101 A1   Aug. 10, 2023

(30) Foreign Application Priority Data

Feb. 9, 2022   (KR) ......................... 10-2022-0016745
Feb. 7, 2023   (KR) ......................... 10-2023-0016127

(51) Int. Cl.
| G06F 16/955 | (2019.01) |
| G06T 7/10 | (2017.01) |
| G06T 7/70 | (2017.01) |

(52) U.S. Cl.
CPC ...... *G06F 16/9558* (2019.01); *G06F 16/9566* (2019.01); *G06T 7/10* (2017.01); *G06T 7/70* (2017.01)

(58) Field of Classification Search
CPC ... G06F 16/9558; G06F 16/9566; G06T 7/10; G06T 7/70; G06Q 30/0631
See application file for complete search history.

(56) References Cited

U.S. PATENT DOCUMENTS

| 10,096,122 | B1 * | 10/2018 | Agrawal | G06T 7/90 |
| 11,120,093 | B1 * | 9/2021 | Cuan | G06T 11/00 |
| 11,308,527 | B1 * | 4/2022 | Plankey | H04N 21/854 |
| 2016/0005097 | A1 * | 1/2016 | Hsiao | G06Q 30/0631 |
| | | | | 705/26.7 |
| 2021/0095970 | A1 * | 4/2021 | Lu | G01C 21/3804 |
| 2021/0224765 | A1 * | 7/2021 | Siddique | G06Q 20/204 |
| 2022/0253889 | A1 * | 8/2022 | Cooper | G06F 16/9558 |

FOREIGN PATENT DOCUMENTS

| JP | 2012-142760 A | 7/2012 |
| KR | 10-1699765 B1 | 1/2017 |
| KR | 10-2021-0087788 A | 7/2021 |
| KR | 10-2485811 B1 | 1/2023 |

* cited by examiner

*Primary Examiner* — Courtney Harmon
(74) *Attorney, Agent, or Firm* — NSIP Law

(57) ABSTRACT

A method and apparatus for providing information are provided, and the method may include receiving an image from a terminal, obtaining coordinate information on objects included in the image from the image, extracting contexts including the objects included in the image and intentions of the objects from the image, obtaining at least one segmented image based on the image and the contexts, obtaining at least one keyword related to at least one of the objects based on the contexts, generating a hyperlink based on the at least one segmented image and the at least one keyword, generating a silhouette based on the hyperlink and the coordinate information, mapping the hyperlink to the silhouette, and transmitting the silhouette to which the hyperlink is mapped to the terminal.

6 Claims, 6 Drawing Sheets

[FIG. 1]
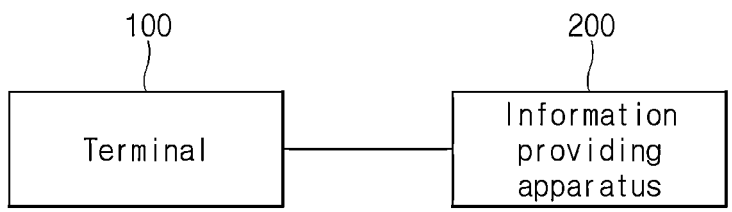
[FIG. 2]
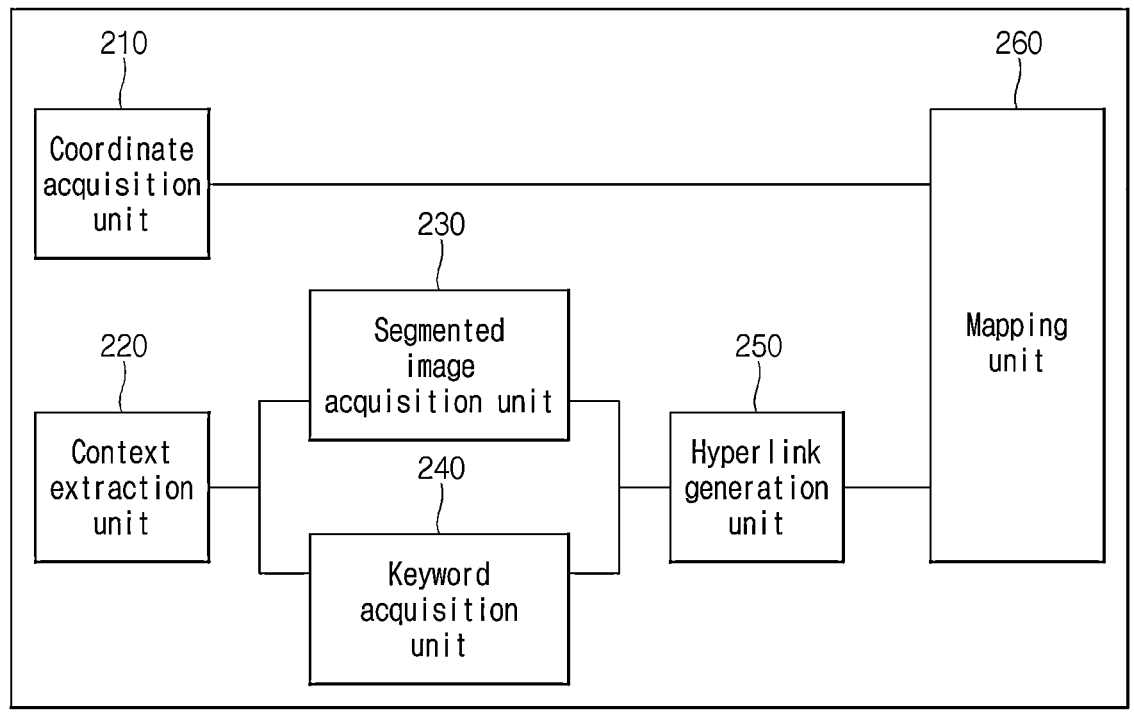

【FIG. 3】
【FIG. 4】
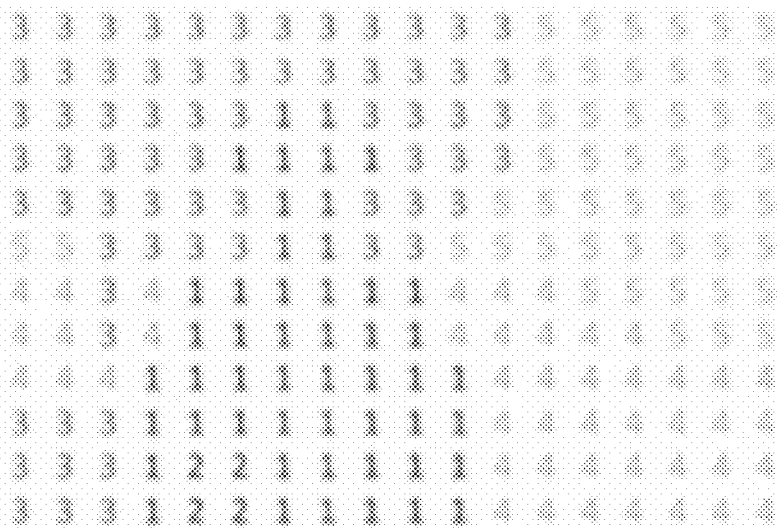

【FIG. 5】
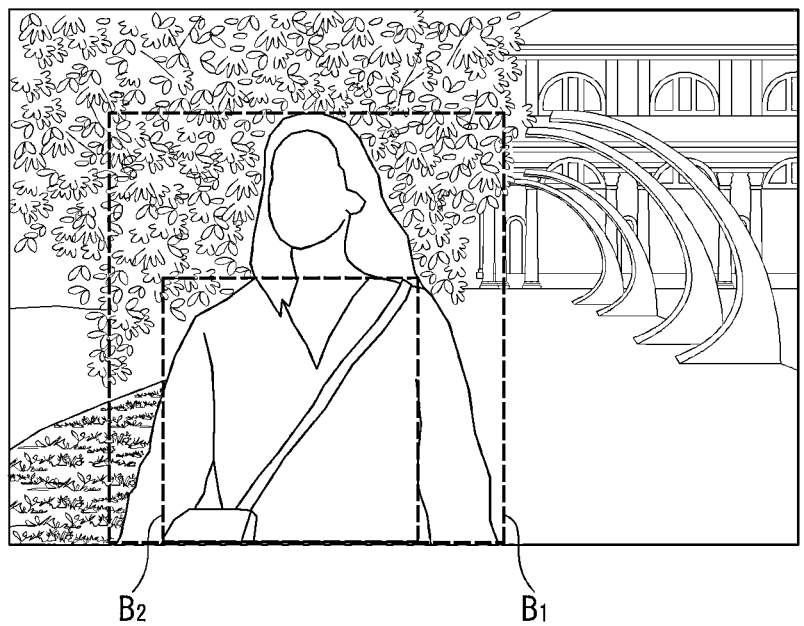
B₂   B₁
【FIG. 6】
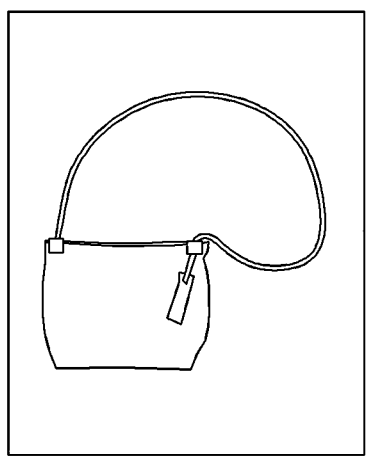
Cowhide crossbody bag
Selling price 58,000 won
Point 500 won (1%)
Color  -choose color- ∨
BUY IT NOW
ADD TO CART
WISH LIST

[FIG. 7]
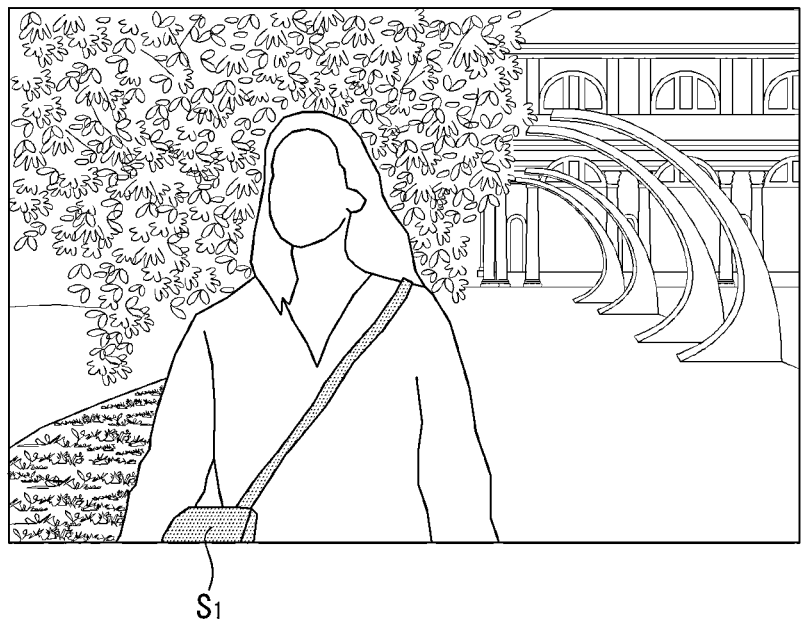

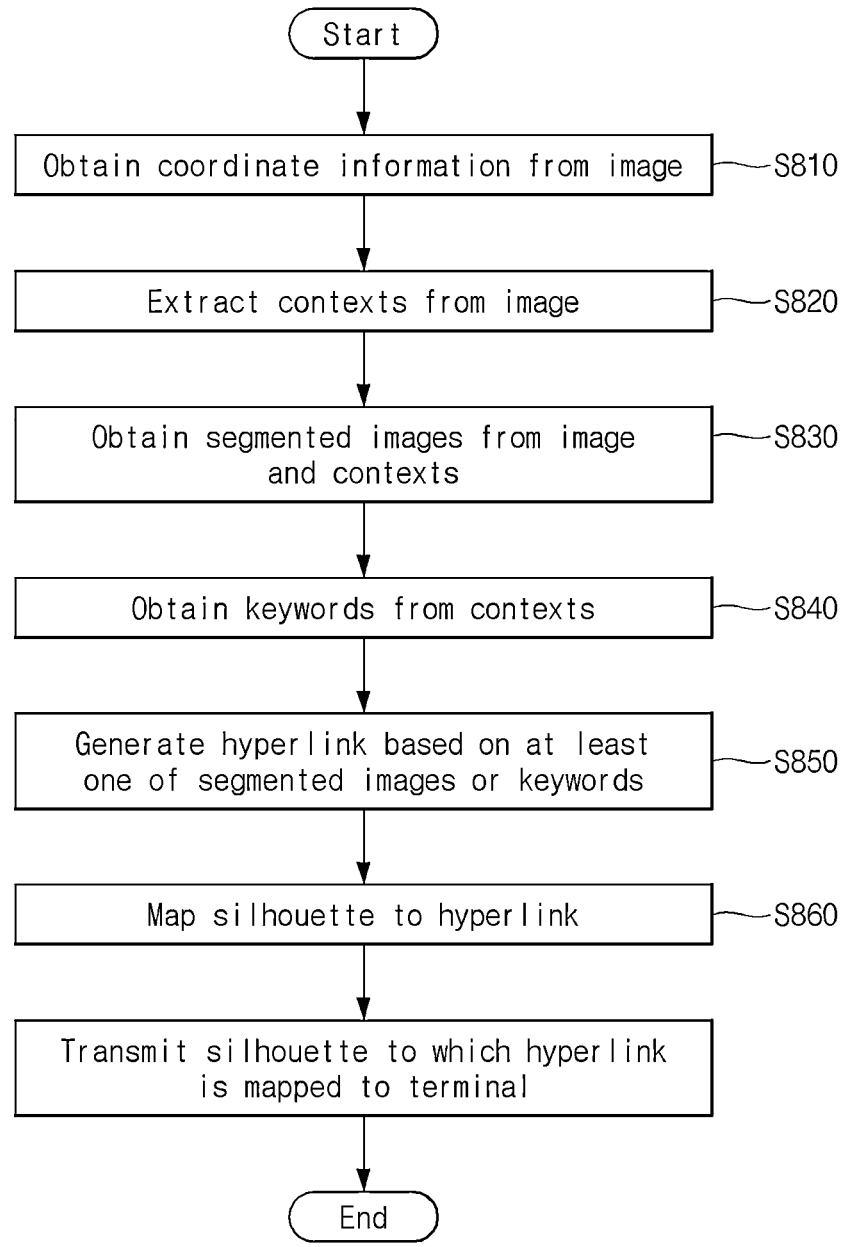

[FIG. 9]
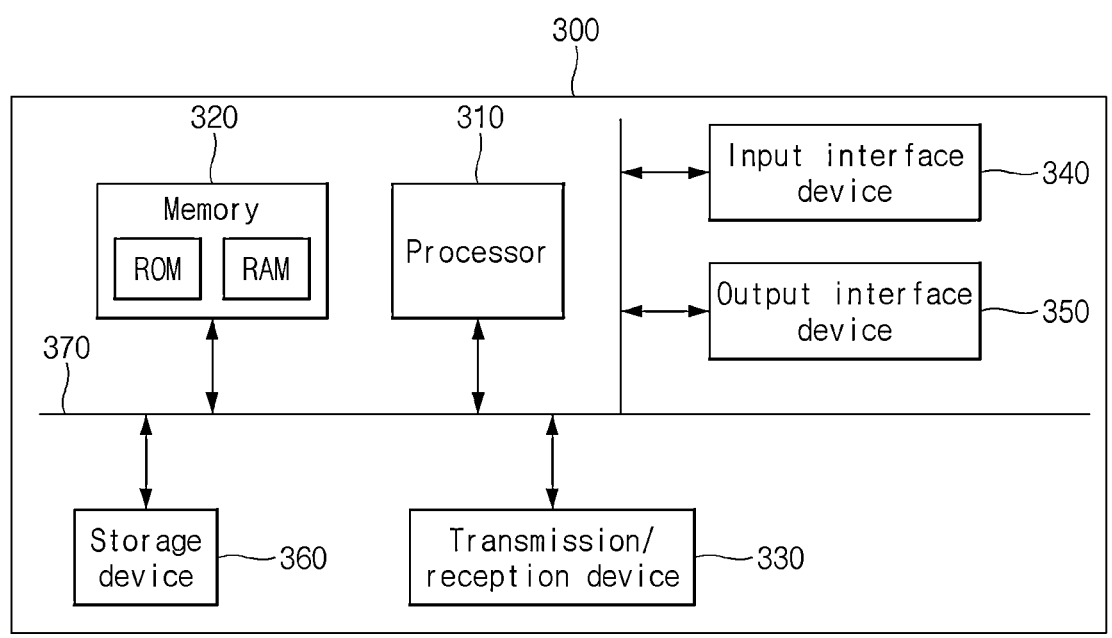

METHOD AND APPARATUS FOR PROVING INFORMATION BASED ON IMAGE

CROSS-REFERENCE TO RELATED APPLICATIONS

This application claims the benefit under 35 U.S.C. § 119(a) of Korean Patent Application No. 10-2022-0016745 filed on Feb. 9, 2022, and Korean Patent Application No. 10-2023-0016127 filed on Feb. 7, 2023, in the Korean Intellectual Property Office, the entire disclosure of which is incorporated herein by reference for all purposes.

TECHNICAL FIELD

The present disclosure relates to a method and apparatus for providing information based on images, and more particularly, to a method and apparatus for providing information based on segmented images.

BACKGROUND

With the popularization of smartphones and the development of mobile communication networks, access to online platforms by mobile terminals is becoming easier and online activities are increasing. Online platform services are expanding their influence in various fields such as online video, online shopping, social network services (SNS), online delivery, and e-commerce. In general, a gallery application of a terminal can provide offline-based services such as viewing captured or saved photos and editing albums. In order to search for information related to photos stored in a gallery, it may be necessary to separately execute a browser application or the like and switch to an online environment. In order to obtain optimal search information related to photos, it is necessary for a user to attempt a plurality of searches by combining appropriate search keywords.

CONTENT OF INVENTION

Problem to be Solved

The present disclosure is to solve the above-described needs and problems, and an object of the present disclosure is to provide an information providing method and apparatus capable of providing information related to an object included in an image.

Means of Solving the Problem

In an aspect of the present disclosure, a method of providing information includes receiving an image from a terminal, obtaining coordinate information on objects included in the image from the image, extracting contexts including the objects included in the image and intentions of the objects from the image, obtaining at least one segmented image based on the image and the contexts, obtaining at least one keyword related to at least one of the objects based on the contexts, generating a hyperlink based on the at least one segmented image and the at least one keyword, generating a silhouette based on the hyperlink and the coordinate information, mapping the hyperlink to the silhouette, and transmitting the silhouette to which the hyperlink is mapped to the terminal.

The generating of the hyperlink may include selecting at least one of the at least one segmented image or the keyword, generating a search word based on the selection result, obtaining a uniform resource locator (URL) based on the search word, and generating the hyperlink based on the URL.

The selecting of at least one of the at least one segmented image or the keyword may include selecting at least one of the at least one segmented image or the keyword based on a threshold value set based on a detection degree of the object.

The transmitting of the silhouette to which the hyperlink is mapped to the terminal may include overlapping the silhouette to which the hyperlink is mapped on the image, and transmitting the image on which the silhouette overlaps to the terminal.

In an aspect of the present disclosure, an apparatus for providing information includes a memory containing at least one instruction and a processor configured to perform the at least one instruction, wherein the at least one instruction includes receiving an image from a terminal, obtaining coordinate information on objects included in the image from the image, extracting contexts including the objects included in the image and intentions of the objects from the image, obtaining at least one segmented image based on the image and the contexts, obtaining at least one keyword related to at least one of the objects based on the contexts, generating a hyperlink based on the at least one segmented image and the at least one keyword, generating a silhouette based on the hyperlink and the coordinate information, mapping the hyperlink to the silhouette, and transmitting the silhouette to which the hyperlink is mapped to the terminal.

The generating of the hyperlink may include selecting at least one of the at least one segmented image or the keyword, generating a search word based on the selection result, obtaining a uniform resource locator (URL) based on the search word, and generating the hyperlink based on the URL.

The selecting of at least one of the at least one segmented image or the keyword may include selecting at least one of the at least one segmented image or the keyword based on a threshold value set based on a detection degree of the object.

The transmitting of the silhouette to which the hyperlink is mapped to the terminal may include overlapping the silhouette to which the hyperlink is mapped on the image, and transmitting the image on which the silhouette overlaps to the terminal.

Effects of the Invention

According to an embodiment of the present disclosure, a plurality of segmented images and a plurality of keywords suitable for search can be extracted from images stored in a device.

According to an embodiment of the present disclosure, a keyword-based online search can be automatically performed and then a result link can be returned.

According to an embodiment of the present disclosure, an image can be segmented into object units and each silhouette can be displayed in a gallery application.

BRIEF DESCRIPTION OF THE DRAWINGS

FIG. 1 is a block diagram of an information providing system according to an embodiment of the present disclosure.

FIG. 2 is a block diagram of an information providing apparatus according to an embodiment of the present disclosure.

FIG. 3 to FIG. 7 are conceptual diagrams illustrating the information providing apparatus according to an embodiment of the present disclosure.

FIG. 8 is a flowchart of an information providing method according to an embodiment of the present disclosure.

FIG. 9 is a block diagram of an information providing apparatus according to another embodiment of the present disclosure.

SPECIFIC DETAILS FOR CARRYING OUT THE INVENTION

FIG. 1 is a block diagram of an information providing system according to an embodiment of the present disclosure.

Referring to FIG. 1, the information providing system 10 according to an embodiment of the present disclosure may include a terminal 100 and an information providing apparatus 200. Although the terminal 100 and the information providing apparatus 200 are illustrated as separate apparatuses in this specification for convenience of description, the terminal 100 and the information providing apparatus 200 may be integrated.

The terminal 100 and the information providing apparatus 200 may perform communication through a network. The communication method is not limited, and may include not only a communication method utilizing a communication network (e.g., a mobile communication network, wired Internet, wireless Internet, or a broadcasting network) that can be included in the network but also short-range wireless communication between devices. For example, the network may include any one or more networks from among a personal area network (PAN), a local area network (LAN), a campus area network (CAN), a metropolitan area network (MAN), a wide area network (WAN), a broadband network (BBN), the Internet, and the like. In addition, the network may include any one or more of network topologies including, but not limited to, a bus network, a star network, a ring network, a mesh network, a star-bus network, a tree or a hierarchical network, and the like.

The terminal 100 may be a fixed terminal or a mobile terminal implemented as a computer device. For example, the terminal 100 may include a smartphone, a mobile phone, a navigation device, a computer, a laptop computer, a digital broadcasting terminal, a personal digital assistant (PDA), a portable multimedia player (PMP), a tablet PC, and the like, but this is an example and may include all types of computing devices capable of communicating with the information providing apparatus 200.

The terminal 100 can store images and display images. For example, the image may be previously stored in the terminal 100, and if the terminal 100 includes a camera, the images may be captured by the camera. Further, the terminal 100 may include a display and display images through the display. The terminal 100 may transmit images to the information providing apparatus 200.

The information providing apparatus 200 may receive images from the terminal 100. The information providing apparatus 200 may include an artificial neural network. The artificial neural network may include a deep learning model such as Mask-R-CNN, but is not limited thereto. The information providing apparatus 200 may process images based on the artificial neural network. The information providing apparatus 200 may transmit image processing results to the terminal 100. The information providing apparatus 200 may be configured as follows.

FIG. 2 is a block diagram of an information providing apparatus according to an embodiment of the present disclosure. FIG. 3 to FIG. 7 are conceptual diagrams illustrating the information providing apparatus according to an embodiment of the present disclosure.

Referring to FIG. 2 to FIG. 7, the information providing apparatus 200 according to an embodiment of the present disclosure may include a coordinate acquisition unit 210, a context extraction unit 220, a segmented image acquisition unit 230, a keyword acquisition unit 240, a hyperlink generation unit 250, and a mapping unit 260.

The coordinate acquisition unit 210 may receive an image from the terminal 100. The coordinate acquisition unit 210 may obtain coordinate information of an object included in the image. The coordinate acquisition unit 210 may acquire coordinate information of an object included in an image by performing image segmentation. Coordinate information may be a segmentation map. For example, image segmentation may include semantic segmentation or instance segmentation, but is not limited thereto.

The coordinate acquisition unit 210 may obtain coordinate information by segmenting an image into pixel units, recognizing an object from the image, and labeling the object in pixel units. For example, referring to FIGS. 3 and 4, in the case of an image shown in FIG. 3, the coordinate acquisition unit 210 may segment the image into 18×12 pixels. The coordinate acquisition unit 210 may obtain a person, a wallet, plants, a trail, and a building from the image as objects. The coordinate acquisition unit 210 may obtain a segmentation map as shown in FIG. 4 as coordinate information by labeling pixels corresponding to the person in the image by 1, labeling pixels corresponding to the wallet by 2, labeling pixels corresponding to the plants by 3, labeling pixels corresponding to the trail by 4, and labeling pixels corresponding to the building by 5. The coordinate acquisition unit 210 may transmit the coordinate information on the objects to the mapping unit 260.

The context extraction unit 220 may receive the image from the terminal 100. The context extraction unit 220 may extract contexts from the image. The contexts may include objects included in the image and intentions of the objects. For example, the context extraction unit 220 may extract contexts from the image through an application programming interface (API). The API may be one of MS Image Captioning, Alt Text, Computer Vision API, or Google Vision Artificial Intelligence (AI), but is not limited thereto. Further, when clothes are included in an image, the context extraction unit 220 may extract a context from the image based on a deep learning model such as Mask-R-CNN. For example, in the case of the image shown in FIG. 3, the context extraction unit 220 may acquire the person, wallet, plants, trail, and building as objects and obtain a context by acquiring the person intending to take a walk as an intention. The context extraction unit 220 may transmit contexts to the segmented image acquisition unit 230 and the keyword acquisition unit 240.

The segmented image acquisition unit 230 may receive the image from the terminal 100. The segmented image acquisition unit 230 may receive the contexts from the context extraction unit 220. The segmented image acquisition unit 230 may acquire segmented images based on the image and the contexts. The segmented image acquisition unit 230 may generate bounding boxes for a plurality of contexts included in the image. The segmented image acquisition unit 230 may acquire the segmented images by segmenting a plurality of bounding boxes from the image. For example, in the case of the image shown in FIG. 3, the segmented image acquisition unit 230 may generate bounding boxes $B_1$ and $B_2$ for the person and the wallet among the person, wallet, plants, trail, and building corresponding to the contexts, as shown in FIG. 4, and obtain segmented images for the person and the wallet by extracting the bounding boxes $B_1$ and $B_2$. The segmented image acquisition unit 230 may transmit the segmented images to the hyperlink generation unit 250.

The keyword acquisition unit 240 may receive the contexts from the context extraction unit 220. The keyword acquisition unit 240 may acquire keywords based on the contexts. The keyword acquisition unit 240 may acquire keywords related to an object included in the contexts. For example, if the object is a person, keywords may include a name, race, age, sex, or the like. If the object is a background, keywords may include weather, time, light, or place. If the object is an article, keywords may include the type, brand, color, size or use of the article. For example, in the case of the image shown in FIG. 3, the keyword acquisition unit 240 may acquire "white people" and "women" as keywords based on the person, acquire the shape, brand or the like of the wallet as keywords based on the wallet, and acquire the types of plants, and the like as keywords from the plants. The keyword acquisition unit 240 may acquire keywords such as "sunny," "daytime," and the like when the object is the background.

The keyword acquisition unit 240 may acquire keywords related to the intention of an object included in the contexts. For example, when in the case of the image shown in FIG. 3, the keyword extraction unit may obtain keywords such as "walking," "exercising," and the like based on the woman's intention to take a walk. The keyword acquisition unit 240 may acquire keywords by performing deep learning, but the present disclosure is not limited thereto. The keyword acquisition unit 240 may transmit the keywords to the hyperlink generation unit 250. The hyperlink generation unit 250 may receive the segmented images from the segmented image acquisition unit 230. The hyperlink generation unit 250 may receive the keywords from the keyword acquisition unit 240. The hyperlink generation unit 250 may obtain a uniform resource locator (URL) based on at least one of the segmented images or the keywords. The hyperlink generation unit 250 may select at least one of the segmented images or the keywords based on a threshold value. The threshold value may be set in advance based on object detection accuracy but is not limited thereto.

The hyperlink generation unit 250 may generate a search word based on at least one of the segmented images or the keywords. The hyperlink generation unit 250 may generate a search word through a method such as performing deep learning or combining words. The hyperlink generation unit 250 may obtain a URL based on the search word.

For example, a search word related to the wallet may be generated based on at least one of the segmented image with respect to the wallet or keywords such as the type and brand of the wallet, obtained based on the image of FIG. 3. The hyperlink generation unit 250 may obtain a URL of a wallet shopping mall as shown in FIG. 6 based on the search word related to the wallet. The hyperlink generation unit 250 may generate a hyperlink based on the obtained URL. The hyperlink generation unit 250 may transmit the hyperlink to the mapping unit 260. The mapping unit 260 may receive the coordinate information from the coordinate acquisition unit 210. The mapping unit 260 may receive the hyperlink from the hyperlink generation unit 250. The mapping unit 260 may obtain information on an object related to the hyperlink. The mapping unit 260 may obtain pixels including the object based on the coordinate information. The mapping unit 260 may represent the edge of the object in the form of a silhouette based on the pixels including the object. For example, the mapping unit 260 may create a silhouette in all pixels including the object or in a portion corresponding to the edge of the object among the pixels.

The mapping unit 260 may map the silhouette to the hyperlink. The mapping unit 260 may transmit the mapping result to the terminal 100. Alternatively, the mapping unit 260 may synthesize a silhouette in which the hyperlink is mapped to the image and transmit the synthesized image to the terminal 100. For example, when the mapping unit 260 obtains the coordinate information as shown in FIG. 4 and the hyperlink for the wallet shopping mall as shown in FIG. 6, the mapping unit 260 may obtain information about the object being a wallet based on the hyperlink. The mapping unit 260 may obtain pixels labeled as 2, which are pixels related to the wallet, in the image based on the coordinate information of FIG. 4. The mapping unit 260 may generate a silhouette of the wallet based on the labeled pixels. Although a silhouette is created in all pixels related to the wallet in the figure, a silhouette may be created in pixels related to the edge of the wallet among the pixels. The mapping unit 260 may map the silhouette to the hyperlink. The mapping unit 260 may transmit the silhouette overlapping on the hyperlink to the terminal 100. In this case, the silhouette overlapping on the hyperlink may be overlapped on the image by the terminal 100.

Alternatively, the mapping unit 260 may overlap the hyperlink to which the silhouette is mapped on the image, and transmit the image on which the silhouette overlaps to the terminal 100. In this case, in the terminal 100, the silhouette $S_1$ may overlap the wallet part as shown in FIG. 7, and when the user touches or clicks the silhouette, the URL of the wallet shopping mall as shown in FIG. 6 can be accessed. Although description is based on the silhouette $S_1$ for the entire wallet part in FIG. 7, a silhouette for the edge of the wallet part may overlap.

FIG. 8 is a flowchart of an information providing method according to an embodiment of the present disclosure.

Referring to FIG. 8, an information providing apparatus may obtain coordinate information from an image (S810). The information providing apparatus (e.g., the information providing apparatus 200 of FIG. 1) may receive an image from a terminal (e.g., the terminal 100 of FIG. 1). The information providing apparatus may acquire the coordinate information by segmenting the image into pixel units, recognizing an object from the image, and labeling the object in pixel units.

The information providing apparatus may extract a context from the image (S820). The information providing apparatus may acquire segmented images based on the image and the context (S830).

The information providing apparatus may acquire keywords from the context (S840). The information providing apparatus may obtain keywords related to the object included in the context and an intention of the object.

The information providing apparatus may generate a hyperlink based on at least one of the segmented images or the keywords (S850). The information providing apparatus may select at least one of the segmented images or the keywords based on a threshold value. The information providing apparatus may generate a search word based on a selection result. The information providing apparatus may obtain a URL based on the search word. The information providing apparatus may generate a hyperlink based on the URL.

The information providing apparatus may map a silhouette to the hyperlink (S850). The information providing apparatus may obtain an object corresponding to the hyperlink based on the hyperlink. The information providing apparatus may obtain pixels including the object based on the coordinate information. The information providing apparatus may generate a silhouette for the pixels including the object. The information providing apparatus may map the silhouette to the hyperlink.

The information providing apparatus may transmit the silhouette to which the hyperlink is mapped to the terminal (S860). The information providing apparatus may transmit the silhouette to which the hyperlink is mapped to the terminal. Alternatively, the information providing apparatus may overlap the silhouette to which the hyperlink is mapped with an image, and transmit the image overlapping with the silhouette to the terminal.

FIG. 9 is a block diagram of an information providing apparatus according to another embodiment of the present disclosure.

The information providing apparatus 300 of FIG. 9 may be the same as the information providing apparatus 200 of FIG. 1. The information providing apparatus 300 may include at least one processor 310, a memory 320, and a transmission/reception device 330 connected to a network to perform communication. In addition, the host controller 300 may further include an input interface device 340, an output interface device 350, a storage device 360, and the like. The components included in the host controller 300 may be connected through a bus 370 to communicate with each other. However, the components included in the host controller 300 300 may be connected through individual interfaces or individual buses based on the processor 310 instead of the common bus 370. For example, the processor 310 may be connected to at least one of the memory 320, the transmission/reception device 330, the input interface device 340, the output interface device 350, and the storage device 360 through a dedicated interface. The processor 310 may execute program commands stored in at least one of the memory 320 and the storage device 360. The processor 310 may mean a central processing unit (CPU), a graphics processing unit (GPU), or a dedicated processor that performs methods according to embodiments of the present disclosure. Each of the memory 320 and the storage device 360 may be configured as at least one of a volatile storage medium and a non-volatile storage medium. For example, the memory 320 may include at least one of a read only memory (ROM) and a random access memory (RAM).

Most terms used in the present disclosure are selected from common ones widely used in the field, but some terms are arbitrarily selected by the applicant and their meanings are described in detail in the following description as needed. Therefore, the present disclosure should be understood based on intended meanings of terms rather than the simple names or meanings of the terms.

It is apparent to those skilled in the art that the present invention can be embodied in other specific forms without departing from the essential features of the present invention. Accordingly, the foregoing detailed description should not be construed as limiting in all respects and should be considered illustrative. The scope of the present invention should be determined by reasonable interpretation of the appended claims, and all changes within the equivalent scope of the present invention are included in the scope of the present invention.

The invention claimed is:

1. A processor-implemented method of providing information, the method comprising:
   wirelessly receiving, using a wireless communication, an image from a terminal, the image being captured using an image sensor;
   generating a segmentation map including coordinate information on objects included in the image from the image, including segmenting the image into pixel units and recognizing the objects and labeling the objects with pixel values, differently assigned for each of the objects, in pixel units corresponding to each of the objects, wherein the pixel values are used to identify and distinguish different objects in the image;
   extracting contexts including the objects included in the image and determining intentions of the objects based on the contexts;
   obtaining at least one segmented image based on the image and the contexts using the segmentation map;
   obtaining at least one keyword related to at least one of the objects based on the contexts;
   generating a hyperlink based on the at least one segmented image and the at least one keyword, including selecting at least one of the at least one segmented image or the keyword based on a threshold value set in advance based on predetermined objection detection accuracy, wherein the threshold value relates to object detection accuracy in the image;
   generating a silhouette based on the hyperlink and the coordinate information, wherein the silhouette corresponds to the object's boundaries according to the coordinate information;
   mapping the hyperlink to the silhouette; and
   wirelessly transmitting, using the wireless communication, the silhouette, to which the hyperlink is mapped, to the terminal.

2. The method of claim 1, wherein the generating of the hyperlink comprises:
   selecting at least one of the at least one segmented image or the keyword;
   generating a search word based on the selection result;
   obtaining a uniform resource locator (URL) based on the search word; and
   generating the hyperlink based on the URL, wherein the URL is associated with information related to the object.

3. The method of claim 1, wherein the transmitting of the silhouette to which the hyperlink is mapped to the terminal comprises:
   overlapping the silhouette to which the hyperlink is mapped on the image, wherein the silhouette represents a boundary of the object; and
   transmitting the image on which the silhouette overlaps to the terminal.

4. An apparatus for providing information, comprising:
   a memory containing at least one instruction; and
   a processor configured to perform the at least one instruction;
   wherein the at least one instruction comprises:
   wirelessly receiving, using a wireless communication, an image from a terminal, the image being captured using an image sensor;
   generating a segmentation map including coordinate information on objects included in the image from the image, including segmenting the image into pixel units and recognizing the objects and labeling the objects with pixel values, differently assigned for each of the objects, in pixel units corresponding to each of the objects, wherein the pixel values are used to identify and distinguish different objects in the image;

extracting contexts including the objects included in the image and determining intentions of the objects based on the contexts;

obtaining at least one segmented image based on the image and the contexts using the segmentation map;

obtaining at least one keyword related to at least one of the objects based on the contexts;

generating a hyperlink based on the at least one segmented image and the at least one keyword, including selecting at least one of the at least one segmented image or the keyword based on a threshold value set in advance based on predetermined objection detection accuracy, wherein the threshold value relates to object detection accuracy in the image;

generating a silhouette based on the hyperlink and the coordinate information, wherein the silhouette corresponds to the object's boundaries according to the coordinate information;

mapping the hyperlink to the silhouette; and wirelessly transmitting, using the wireless communication, the silhouette to which the hyperlink is mapped to the terminal.

5. The apparatus of claim 4, wherein the generating of the hyperlink comprises:

selecting at least one of the at least one segmented image or the keyword;

generating a search word based on the selection result;

obtaining a uniform resource locator (URL) based on the search word; and generating the hyperlink based on the URL, wherein the URL is associated with information related to the object.

6. The apparatus of claim 4, wherein the transmitting of the silhouette to which the hyperlink is mapped to the terminal comprises:

overlapping the silhouette to which the hyperlink is mapped on the image, wherein the silhouette represents a boundary of the object; and transmitting the image on which the silhouette overlaps to the terminal.

* * * * *